(12) United States Patent
Takeuchi et al.

(10) Patent No.: US 8,507,629 B2
(45) Date of Patent: Aug. 13, 2013

(54) ORGANIC POLYMER CONTAINING TWO OR MORE ORGANIC RING STRUCTURES AND A CHAIN STRUCTURE THREADING THROUGH THE ORGANIC RING STRUCTURES, AND PRODUCTION METHOD THEREOF

(75) Inventors: Takayuki Takeuchi, Osaka (JP); Norihisa Mino, Osaka (JP); Nobuaki Kambe, Hyogo (JP); Jun Terao, Osaka (JP)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 12/516,049

(22) PCT Filed: Dec. 6, 2007

(86) PCT No.: PCT/JP2007/073599
§ 371 (c)(1),
(2), (4) Date: May 22, 2009

(87) PCT Pub. No.: WO2008/069274
PCT Pub. Date: Jun. 12, 2008

(65) Prior Publication Data
US 2010/0022737 A1    Jan. 28, 2010

(30) Foreign Application Priority Data
Dec. 8, 2006    (JP) .................. 2006-332048

(51) Int. Cl.
*C08F 251/00*    (2006.01)
*C08L 5/16*    (2006.01)
*A01N 1/00*    (2006.01)

(52) U.S. Cl.
USPC ........ 527/300; 523/112; 424/78.38; 424/488; 424/529

(58) Field of Classification Search
USPC .............. 527/300; 523/112; 424/78.38, 488, 424/529
See application file for complete search history.

(56) References Cited

FOREIGN PATENT DOCUMENTS

| JP | 2005-75979 A | 3/2005 |
|---|---|---|
| JP | 2006-28103 A | 2/2006 |
| JP | 2006-233007 A | 9/2006 |
| JP | 2007-211060 | 8/2007 |

OTHER PUBLICATIONS

Sugiyama etal., Chemical Society of Japan, 2006, 86, 805.*
Taylor et al., Angew Chem. Int. Ed. 2000, 39, 3456.*
Bradshaw et al., Anal. Chem. 1995, 67, 4439.*
Inoue et al. Journal of American Chemical Society, 2006, 128, pp. 8994-8995.*

(Continued)

*Primary Examiner* — James J Seidleck
*Assistant Examiner* — S. Camilla Pourbohloul
(74) *Attorney, Agent, or Firm* — Hamre, Schumann, Mueller & Larson, P.C.

(57) ABSTRACT

A production method of the present invention is a production method of an organic polymer containing two or more organic ring structures and a chain structure threading through the organic ring structures. This method includes a polymerization step of forming the organic polymer, in which the organic ring structures, which are restricted from moving, are disposed at each of a particular constitutional unit, by polymerizing at least one type of monomers each of which has no ionic functional group that releases a metal ion. The above at least one type of monomers include a monomer (M) containing the organic ring structure and a chain component threading through the organic ring structure.

8 Claims, 20 Drawing Sheets

Schematic diagram

(56) References Cited

OTHER PUBLICATIONS

Harada et al. Journal of Inclusion Phenomena and Macrocyclic Chemistry, 2001, vol. 41, pp. 115-121.*

Sugiyama, J. et al. "Synthesis and Chemical Modification of Rotaxane of Cyclodextrin and Oligocarbyne", CSJ: The Chemical Society of Japan Dai 86 Shunki Nenkai Koen Yoshishu II, Mar. 13, 2006, p. 805.

Terao, J. et al. "Synthesis of Poly(*para*-phenylenevinylene) Rotaxanes by Aqueous Suzuki Coupling", Chemical Communications, No. 1, Jan. 7, 2004, pp. 56-57.

Taylor, P. et al. "Insulated Molecular Wires: Synthesis of Conjugated Polyrotaxanes by Suzuki Coupling in Water", Angewandte Chemie International Edition, vol. 39, No. 19, Oct. 2, 2000, pp. 3456-3460.

Michels, J. et al. "Synthesis of Conjugated Polyrotaxanes", Chemistry—a European Journal, vol. 9, No. 24, Dec. 15, 2003, pp. 6167-6176.

Yamaguchi, I. et al. "β-Cyclodextrin Pseudopolyrotaxanes with II-Conjugated Polymer Axles", Macromolecular Rapid Communications, vol. 25, Jun. 21, 2004, pp. 1163-1166.

Park, J. et al. "Reduced Fluorescence Quenching of Cyclodextrin-Acetylene Dye Rotaxanes", Journal of the American Chemical Society, vol. 128, No. 24, Jun. 21, 2006, pp. 7714-7715.

Harada, A. et al. "The Molecular Necklace: A Rotaxane Containing Many Threaded α-Cyclodextrins", Nature, vol. 356, 1992, pp. 325-327.

Okada, M. et al. "Preparation and Characterization of Inclusion Complexes between Methylated Cyclodextrins and Poly(tetrahydrofuran)", Macromolecules, vol. 32, 1999, pp. 7202-7207.

Bradshaw, J. et al. "$6^A$, $6^B$-β-Cyclodextrin-Hexasiloxane Copolymers: Enantiomeric Separations by a β-Cyclodextrin-Containing Rotaxane Copolymer", Analytical Chemistry, vol. 67, No. 23, 1995, pp. 4437-4439.

Weber, N. et al. "Synthesis of a Copper [3]Rotaxane Able to Function as an Electrochemically Driven Oscillatory Machine in Solution, and to Form SAMs on a Metal Surface", Inorganic Chemistry, vol. 42, No. 21, 2003, pp. 6780-6792.

Tuncel, D. et al. "Catalytic Self-Threading: A New Route for the Synthesis of Polyrotaxanes", Macromolecules, vol. 37, 2004, pp. 288-302.

Hoshino, T. et al. "Daisy Chain Necklace: Tri[2]rotaxane Containing Cyclodextrins", Journal of the American Chemical Society, vol. 122, 2000, pp. 9876-9877.

Onagi, H. et al. "An Hermaphrodite [2]Rotaxane: Preparation and Analysis of Structure", Organic Letters, vol. 3, No. 7, 2001, pp. 1041-1044.

* cited by examiner

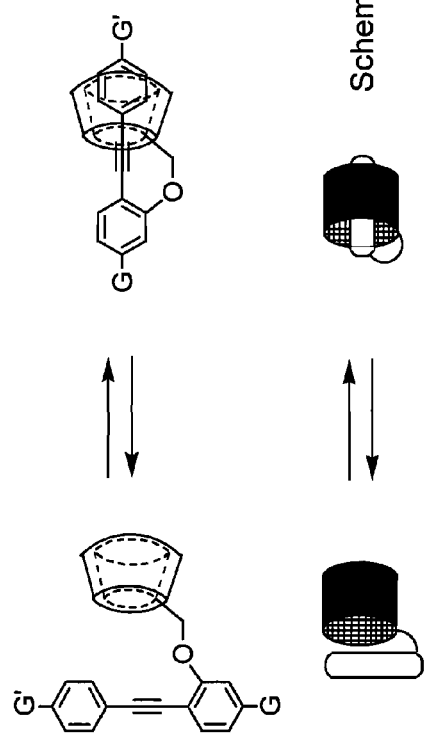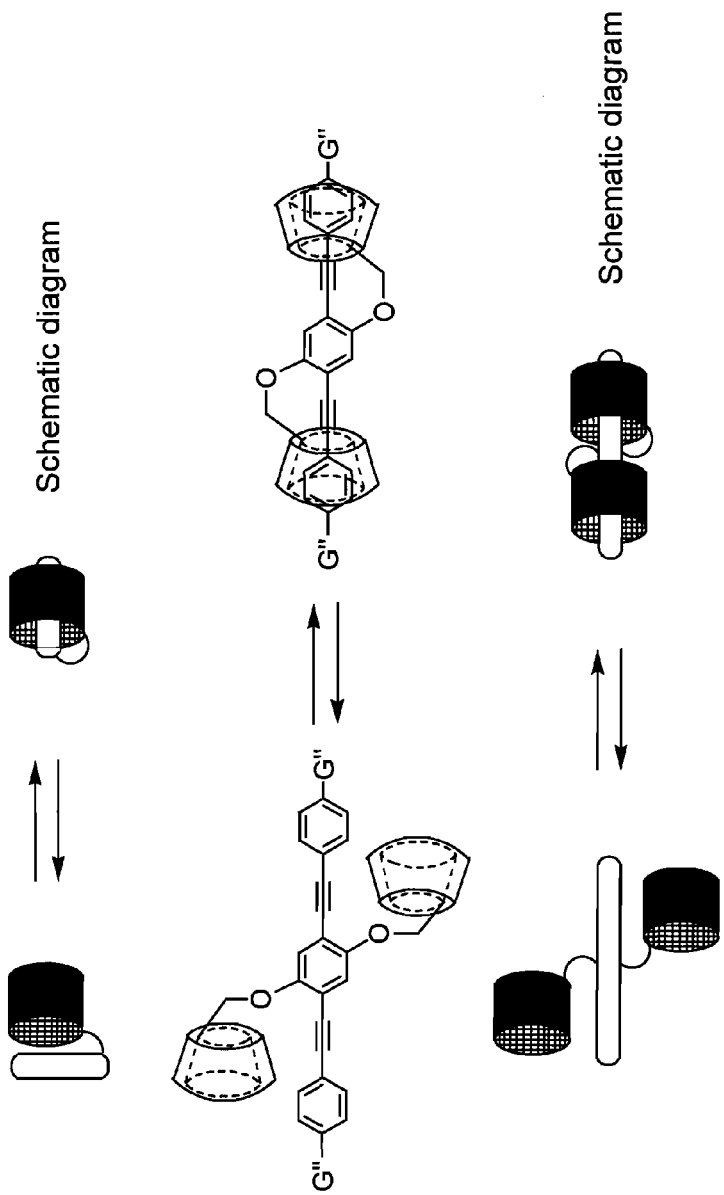
Fig. 1A
Fig. 1B

ORGANIC POLYMER CONTAINING TWO OR MORE ORGANIC RING STRUCTURES AND A CHAIN STRUCTURE THREADING THROUGH THE ORGANIC RING STRUCTURES, AND PRODUCTION METHOD THEREOF

TECHNICAL FIELD

The present invention relates to an organic polymer containing two or more organic ring structures and a chain structure threading through the organic ring structures, and a production method of the organic polymer.

BACKGROUND ART

An organic molecule containing organic ring structures and a chain structure threading through the organic ring structures allows the organic ring structures and the chain structure respectively to have their own functions. As an example of such an organic molecule, a polyrotaxane having two or more rotaxane structures in a single molecule is known. Polyrotaxanes are expected to have a wide variety of applications in the medical, chemical, and electronics fields.

As a method of synthesizing polyrotaxanes, a method of utilizing the hydrophobicity of the interior of the ring structure of a cyclodextrin and the hydrophilicity of the exterior thereof is known. In one example of this method, cyclodextrins and chain-like organic molecules having poor water solubility are mixed in an aqueous solvent. A method is known in which both ends of a guest molecule are modified or substituted with bulky molecules so that the guest molecule is end-capped in order to prevent dethreading of cyclodextrins (A. Harada, J. Li, & M. Kamachi, "Nature", 356, 325 (1992)). It should be noted that a polyrotaxane whose both ends are not capped is sometimes called a pseudo-polyrotaxane.

In the above-mentioned synthesis method, it is difficult to control the amount of cyclodextrins to be used for forming rotaxane structures. Therefore, this method has a problem that the solubility of the resulting polymer decreases due to hydrogen bonding of hydroxyl groups on adjacent cyclodextrins as the amount of cyclodextrins increases, which hinders the progress of the reaction in the solvent. As a countermeasure against this problem, a method is proposed in which hydrophobic monomers included in cyclodextrins and hydrophilic monomers are polymerized alternately with each other by a Suzuki coupling reaction (Harry L. Anderson, et al., Angewandte Chemie International Edition, 39, 3456-3460 (2000)).

The above-mentioned synthesis methods both are reactions carried out in aqueous solvents using cyclodextrins. On the other hand, a method of synthesizing pseudo-polyrotaxanes in an organic solvent by using permethylcyclodextrins obtained by substituting hydroxyl groups of cyclodextrins with methoxy groups is proposed (M. Okada, M. Kamachi, & A. Harada, Macromolecules, 32, 7202 (1999)). A method of synthesizing polyrotaxanes by a solid-state reaction by mixing an end-capping agent with pseudo-polyrotaxanes under pressure (JP 2005-75979 A).

In the above-mentioned synthesis methods of polyrotaxanes described in the documents written by Harada, et al. and Okada, et al., and JP 2005-75979 A, however, a previously synthesized chain-like polymer is included in cyclodextrins or permethylcyclodextrins, which causes a problem that the amount of cyclodextrins or permethylcyclodextrins to be used for the inclusion cannot be controlled. Furthermore, molecules that can be included as guest molecules by the method of Okada, et al. are limited to those of polypropylene glycol, polytetrahydrofuran, etc., as disclosed in Okada, et al. Therefore, this method has a problem that conjugated polymers or the like, which can be used as conductive polymers, cannot be used as guest molecules.

The methods of Harada, et al. and Anderson, et al. are carried out in aqueous solvents by using cyclodextrins. In these methods, water molecules are attracted to hydroxyl groups of cyclodextrins that are hydrophilic functional groups and ionic functional groups of the principal chain thereof, which results in the incorporation of water into a reaction product at the molecular level. Since it is difficult to remove these water molecules, polyrotaxanes synthesized by these methods can hardly be used in applications such as electronics, which are susceptible to adverse effects of water and ions. As a solution of this problem, it is conceivable to substitute the hydrophilic functional groups of the synthesized polyrotaxanes with hydrophobic functional groups. This method is, however, impractical because of its poor reaction efficiency in substituting all the hydrophilic functional groups with hydrophobic functional groups in a polymer state.

DISCLOSURE OF INVENTION

In view of these circumstances, it is one of the objects of the present invention to provide an organic polymer containing two or more organic ring structures and a chain structure threading through the organic ring structures and being expected to achieve excellent characteristics. It is another object of the present invention to provide a method of producing such an organic polymer.

In order to achieve the above objects, a first organic polymer of the present invention is an organic polymer containing two or more organic ring structures and a chain structure threading through the organic ring structures. This organic polymer is composed of at least one type of constitutional units. Each of the at least one type of constitutional units has no ionic functional group that releases a metal ion. The organic ring structures, which are restricted from moving, are disposed at each of a particular constitutional unit of the at least one type of constitutional units.

It should be noted that, in the present description, a "polymer" includes a polymer (such as an oligomer) having a low degree of polymerization. In the present description, a "polymer" also can be referred to as an organic molecule or a macromolecule.

A second organic polymer of the present invention is an organic polymer containing two or more organic ring structures and a chain structure threading through the organic ring structures. In this organic polymer, the chain structure is composed of at least one type of constitutional units. The organic ring structures, which are restricted from moving, are disposed at each of a particular constitutional unit of the at least one type of constitutional units of the chain structure. The chain structure is composed of only a principal chain, or the chain structure contains a principal chain and functional groups bonded to the principal chain, and the functional groups bonded to the principal chain are all hydrophobic.

A first production method of the present invention is a production method of an organic polymer containing two or more organic ring structures and a chain structure threading through the organic ring structures. This method includes a polymerization step of forming the organic polymer, in which the organic ring structures, which are restricted from moving, are disposed at each of a particular constitutional unit, by polymerizing at least one type of monomers, each of which has no ionic functional group that releases a metal ion. The at least one type of monomers include a monomer (M) containing the organic ring structure and a chain component threading through the organic ring structure.

A second production method of the present invention is a production method of an organic polymer containing two or more organic ring structures and a chain structure threading through the organic ring structures. This method includes: a monomer forming step of forming a monomer (M) containing the organic ring structure and a chain component threading through the organic ring structure; and a polymerization step of forming the organic polymer, in which the organic ring structures, which are restricted from moving, are disposed at each of a particular constitutional unit, by polymerizing at least one type of monomers including the monomer (M). The monomer forming step includes the steps of: (A) substituting a hydroxyl group bonded to the organic ring structure with a hydrophobic group; and (B) bonding chemically the organic ring structure and the chain component so that the chain component can be threaded through the organic ring structure. The step (B) is carried out before the step (A), simultaneously with the step (A), or after the step (A).

In the organic polymer of the present invention, the ring structures are disposed regularly in each of a particular repeating unit of the constitutional units of the chain structure. Accordingly, the present invention makes it possible to obtain an organic polymer having less variation in characteristics and thus being stable in performance. The first organic polymer of the present invention can be hydrophobized easily when it is still in a monomeric state because it has, in the main part of its principal chain, no ionic functional group that releases a metal ion. The second organic polymer of the present invention can be synthesized by polymerizing monomers in a non-aqueous solvent because no hydrophilic group is bonded to the principal chain. The synthesis in a non-aqueous solvent avoids the incorporation of water at the molecular level. Accordingly, the present invention makes it possible to obtain a highly reliable organic polymer even in applications susceptible to concerns about adverse effects of water and ions.

BRIEF DESCRIPTION OF DRAWINGS

FIG. 1A and FIG. 1B are diagrams showing examples of an inclusion phenomenon of monomers used in a production method of the present invention.

BEST MODE FOR CARRYING OUT THE INVENTION

Figure 2:
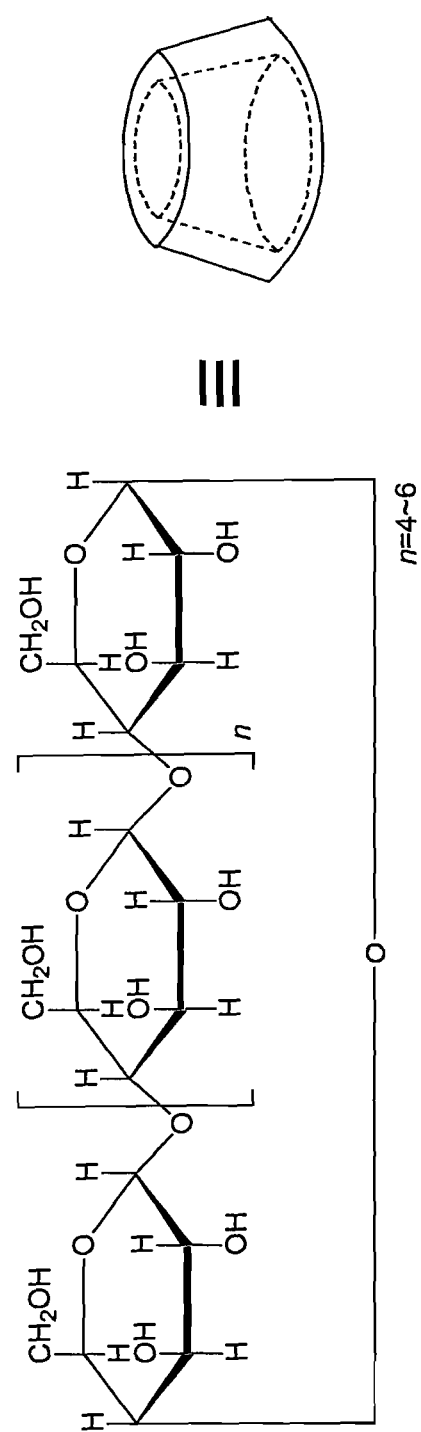
FIG. 2 is a diagram showing a chemical formula of a cyclodextrin.

Hereinafter, embodiments of the present invention will be described. It should be noted, however, that the present invention is not limited to the description of the following embodiments and Examples. In the following description, a specific numerical value or a specific material may be illustrated as an example. However, other numerical values or other materials may be applied as long as the advantageous effects of the present invention can be attained.

[First Organic Polymer of the Present Invention]

The first organic polymer of the present invention contains two or more organic ring structures and a chain structure threading through the organic ring structures. The first organic polymer is composed of at least one type of constitutional units. Each of the at least one type of constitutional units has no ionic functional group that releases a metal ion.

When one type of constitutional units is used, a repetition of the constitutional units constitutes the organic polymer. When two or more types of constitutional units are used, a regular or irregular repetition of the constitutional units constitutes the organic polymer.

An ionic functional group that releases a metal ion is a functional group that releases a metal ion (cation) in a solvent to become itself an anionic group. Examples of the ionic functional group include metal salts of hydroxyl group, metal salts of carboxyl group, and metal salts of sulfonic acid group. For example, when a metal ion is represented as "$M^+$", a group such as $-O^-M^+$, $-COO^-M^+$, and $-SO_3^-M^+$ is an ionic functional group that releases a metal ion.

It is preferable that each of the at least one type of constitutional units has no ionic functional group. An ionic functional group is a functional group that is ionized in water. Examples of the ionic functional group include a hydroxyl group, a carboxyl group, an amino group, and a sulfonic acid group.

The organic ring structures, which are restricted from moving, are disposed at each of a particular constitutional unit of the above at least one type of constitutional units. For example, when the organic polymer is composed of only one type of constitutional units, the organic ring structures are disposed at each of the constitutional units. When the organic polymer is composed of two or more types of constitutional units, the organic ring structures may be disposed at each of a particular constitutional unit of all the constitutional units, or they may be disposed at all the constitutional units. For example, when the organic polymer is composed of first and second constitutional units that are arranged alternately, the organic ring structures may be disposed only at each of the first constitutional units, or they may be disposed at all the first and second constitutional units.

When only one type of constitutional units is used, or two or more types of constitutional units are arranged regularly, the organic ring structures are disposed regularly in each of a particular repeating unit of the constitutional units.

The chain structure is formed by a polymerization reaction. The use of a chain structure having a functionality makes it possible to obtain an organic polymer having the functionality. For example, the use of a chain structure having conductivity makes it possible to obtain an organic polymer having conductivity. Organic polymers having conductivity can be used in various applications such as electronics. Preferably, the chain structure having conductivity is a π-electron conjugated chain (π-conjugated chain). Specifically, a chain structure having a structure in which one type or plural types of functional groups, such as an aromatic chain group, a condensed polycyclic aromatic group, a —CH=CH— group, and a —C≡C— group, are bonded in series may be used. The chain structure having conductivity may be formed by coupling in chains two or more functional groups of at least one type selected from the group consisting of an aromatic chain group, a condensed polycyclic aromatic group, a —CH=CH— group, and a —C≡C— group.

The organic ring structure is a ring structure that can be threaded onto the chain structure. The organic ring structure may be, for example, a ring structure composed only of carbon atoms, or a ring structure containing carbon atoms and atoms of at least one element selected from the group consisting of oxygen and nitrogen. Examples of such an organic ring structure include a ring structure of a cyclodextrin (skeleton of a cyclodextrin) and a ring structure (skeleton) of a macrocycle to be described later.

In the organic polymer of the present invention, the organic ring structures are restricted from moving. Specifically, each of the organic ring structures is restricted from moving from the constitutional unit at which it is disposed to the adjacent constitutional unit. Examples of techniques for restricting the movement of the organic ring structure are as follows.

In the first example, the chain structure and the organic ring structure are bonded chemically. This chemical bonding between them restricts the movement of the organic ring structure.

In the second example, the chain structure has a side chain, which restricts the movement of the organic ring structure. The side chain has a size large enough to restrict the movement of the organic ring structure.

It is preferable that the chain structure of the first organic polymer of the present invention has no hydrophilic functional group. Examples of the hydrophilic functional group include a hydroxyl group, a carboxyl group, and a sulfonic acid group.

It is preferable that in the first organic polymer of the present invention, hydrophobic functional groups bonded to organic ring structures are greater in number than hydrophilic functional groups bonded to the organic ring structures. In this case, the chain structure preferably has no hydrophilic functional group. Examples of the hydrophobic functional group include a hydrocarbon group such as an alkyl group, and a trialkylsilyl group such as a trimethylsilyl group.

In the first organic polymer of the present invention, functional groups bonded to the organic ring structures may all be hydrophobic. In this case, the chain structure preferably has no hydrophilic functional group. For example, each of the organic ring structures may be a ring structure of a cyclodextrin, and functional groups bonded to the organic ring structures may all be hydrophobic. Specifically, a cyclodextrin, in which the hydroxyl groups are all substituted with hydrophobic groups (for example, alkoxy groups such as methoxy groups), can be used. It should be noted that the organic ring structure may contain an ether bond.

It is preferable that the first organic polymer of the present invention is dissolved in a non-aqueous solvent. Polymers that can be dissolved in a non-aqueous solvent exhibit hydrophobicity and thus it is hard to incorporate water molecules therein. Examples of the non-aqueous solvent include organic solvents such as methanol, methylene chloride, toluene, and chloroform.

[Second Organic Polymer of the Present Invention]

The second organic polymer of the present invention contains two or more organic ring structures and a chain structure threading through the organic ring structures. The second organic polymer is composed of at least one type of constitutional units. As is the case with the first organic polymer, the organic ring structures, which are restricted from moving, are disposed at each of a particular constitutional unit of the above at least one type of constitutional units of the chain structure.

The chain structure of the second organic polymer is either one of the following two examples. In the first example, the chain structure is composed of only a principal chain. In the second example, the chain structure contains a principal chain and functional groups bonded to the principal chain, and the functional groups bonded to the principal chain are all hydrophobic. That is, no hydrophilic functional group is bonded to the principal chain of the chain structure of the organic polymer. Examples of the hydrophilic functional group include a hydroxyl group, a carboxyl group, and a sulfonic acid group. Examples of the hydrophobic functional group include a hydrocarbon group such as an alkyl group, and a trialkylsilyl group such as a trimethylsilyl group.

The second organic polymer of the present invention is one example of the first organic polymer of the present invention. All the descriptions of the second organic polymer other than the features as described above are the same as those of the first organic polymer, and the overlapping descriptions are not repeated.

[First Production Method of Organic Polymer]

The first method of the present invention for producing an organic polymer is a production method of an organic polymer containing two or more organic ring structures and a chain structure threading through the organic ring structures. According to the first production method, the first organic polymer of the present invention can be obtained. It should be noted that the descriptions overlapping with those of the first organic polymer of the present invention may be omitted.

The first production method includes a polymerization step of forming the organic polymer, in which the organic ring structures, which are restricted from moving, are disposed at each of a particular constitutional unit, by polymerizing at least one type of monomers each of which has no ionic functional group that releases a metal ion.

In another aspect, the production method of the present invention includes a polymerization step of forming the organic polymer, in which the organic ring structures, which are restricted from moving, are disposed at each of a particular constitutional unit, by polymerizing, in a non-aqueous solvent, at least one type of monomers dissolved in the non-aqueous solvent.

The monomers to be polymerized may be one type of monomers or two or more types of monomers, but each of such monomers has no ionic functional group that releases a metal ion. The monomers to be polymerized includes a monomer containing the organic ring structure and a chain component threading through the organic ring structure. Hereinafter, this monomer may be referred to as a "monomer (M)". The monomers to be polymerized may consist of only the monomers (M), or they may include the monomers (M) and other types of monomers.

In one example, monomers each having no ionic functional group are used. That is, each of the above at least one type of monomers may be a monomer having no ionic functional group. Since the "ionic functional group" and the "ionic functional group that releases a metal ion" have been described above, the description thereof is not repeated here.

As described above, the chain component of the monomer (M) may contain a portion for restricting the movement of the organic ring structure, such as, for example, a side chain, a bulky portion, a bent portion, and a cyclic structure. The chain component and the organic ring structure may be bonded chemically. The chain component of the monomer (M) is a molecular chain that constitutes the above-mentioned chain structure (for example, the chain structure having conductivity) when it is polymerized with another.

As the organic ring structure, the above-mentioned organic ring structure is used. For example, the organic ring structure may be a ring structure of a cyclodextrin. In this case, functional groups bonded to the organic ring structure may all be hydrophobic. That is, all the hydroxyl groups of the cyclodextrin may be substituted with hydrophobic groups.

In the production method of the present invention, it is preferable to form the organic polymer by polymerizing monomers in a non-aqueous solvent. This formation of the organic polymer prevents water molecules and ions from remaining in the polymer. Examples of the non-aqueous solvent include organic solvents such as methanol and methylene chloride. In this case, the monomer (M) is a monomer that can be dissolved in a non-aqueous solvent.

The production method of the present invention may include a monomer forming step for forming the monomer (M) before the polymerization step. Examples of the monomer forming step are as follows.

In the first example of the monomer forming step, first, the hydroxyl group of a cyclodextrin is substituted with a hydrophobic group (Step (i)). Next, the substituted cyclodextrin and the chain component are bonded chemically so that the chain component can be threaded through the substituted cyclodextrin (Step (ii)). It is possible to thread the chain component through the cyclodextrin by selecting an appropriate condition (for example, a solvent).

In the second example of the monomer forming step, first, a chain component (1) is threaded through the cyclodextrin and the chain component (1) and a chain component (2) having a side chain are bonded chemically.

In the third example of the monomer forming step, the organic ring structure is a ring structure of a cyclodextrin. This monomer forming step includes a step of forming the chain component threading through a macrocycle by reacting, through both sides of the macrocycle respectively, two organic molecules each containing a portion for preventing dethreading of the macrocycle. These two organic molecules can be reacted with each other by using a catalyst. It is possible to form the chain component threading through the macrocycle by placing a metal catalyst in the center of the macrocycle.

[Second Production Method of Organic Polymer]

The second method of the present invention for producing an organic polymer is a production method of an organic polymer containing two or more organic ring structures and a chain structure threading through the organic ring structures. Hereinafter, the organic polymer produced by the second production method may be referred to as an "organic polymer (P2)". The second production method includes a monomer forming step and a polymerization step.

In the monomer forming step, a monomer (M) containing the organic ring structure and a chain component threading through the organic ring structure is formed. Next, in the polymerization step, the organic polymer (P2), in which the organic ring structures, which are restricted from moving, are disposed at each of a particular constitutional unit, is formed by polymerizing at least one type of monomers including the monomer (M) in a non-aqueous solvent.

The above-mentioned monomer forming step includes the following steps (A) and (B). In the step (A), a hydroxyl group bonded to the organic ring structure is substituted with a hydrophobic group. The organic ring structure is, for example, a ring structure of a cyclodextrin. In the step (B), the organic ring structure and the above chain component are bonded chemically so that the chain component can be threaded through the organic ring structure. The step (B) is carried out before the step (A), simultaneously with the step (A), or after the step (A).

The second production method of the organic polymer is one example of the first production method. Therefore, the descriptions overlapping with those of the first production method are not repeated here.

Hereinafter, embodiments of the present invention will be described with reference to the following Examples.

[First Embodiment]

In the first embodiment, an example of an organic polymer in which a chain structure and organic ring structures are bonded chemically will be described.

First, as shown in FIGS. 1A and 1B, molecules each containing a chain component and a cyclodextrin derivative bonded thereto are prepared. In each of these molecules, one of —$CH_2OH$ groups shown in FIG. 2 is bonded to the chain component in the form of —$CH_2O$—, and other —OH groups are all substituted with —$OCH_3$ groups.

The chain component is not limited to the chain components shown in FIGS. 1A and 1B. Specifically, a chain component having a structure in which one or plural types of functional groups, such as an aromatic chain group, a condensed polycyclic aromatic group, a —CH=CH— group, and a —C≡C— group, are coupled in series may be used. Each of these molecules has reactive groups G and G', or G" serving as reactive sites when it is polymerized at both ends thereof or the chain component is extended to maintain the inclusion state.

As shown in FIG. 2, cyclodextrin is a cyclic (ring-shaped) oligomer of glucoses, and the size of its ring structure varies according to the number of glucoses. Therefore, a type of a cyclodextrin having a suitable number of glucoses can be selected according to the size of a hydrophobic monomer to be included therein. It should be noted that, in FIG. 2, a cyclodextrin is called α-cyclodextrin in the case of n=4, β-cyclodextrin in the case of n=5, and γ-cyclodextrin in the case of n=6.

Figure 3:
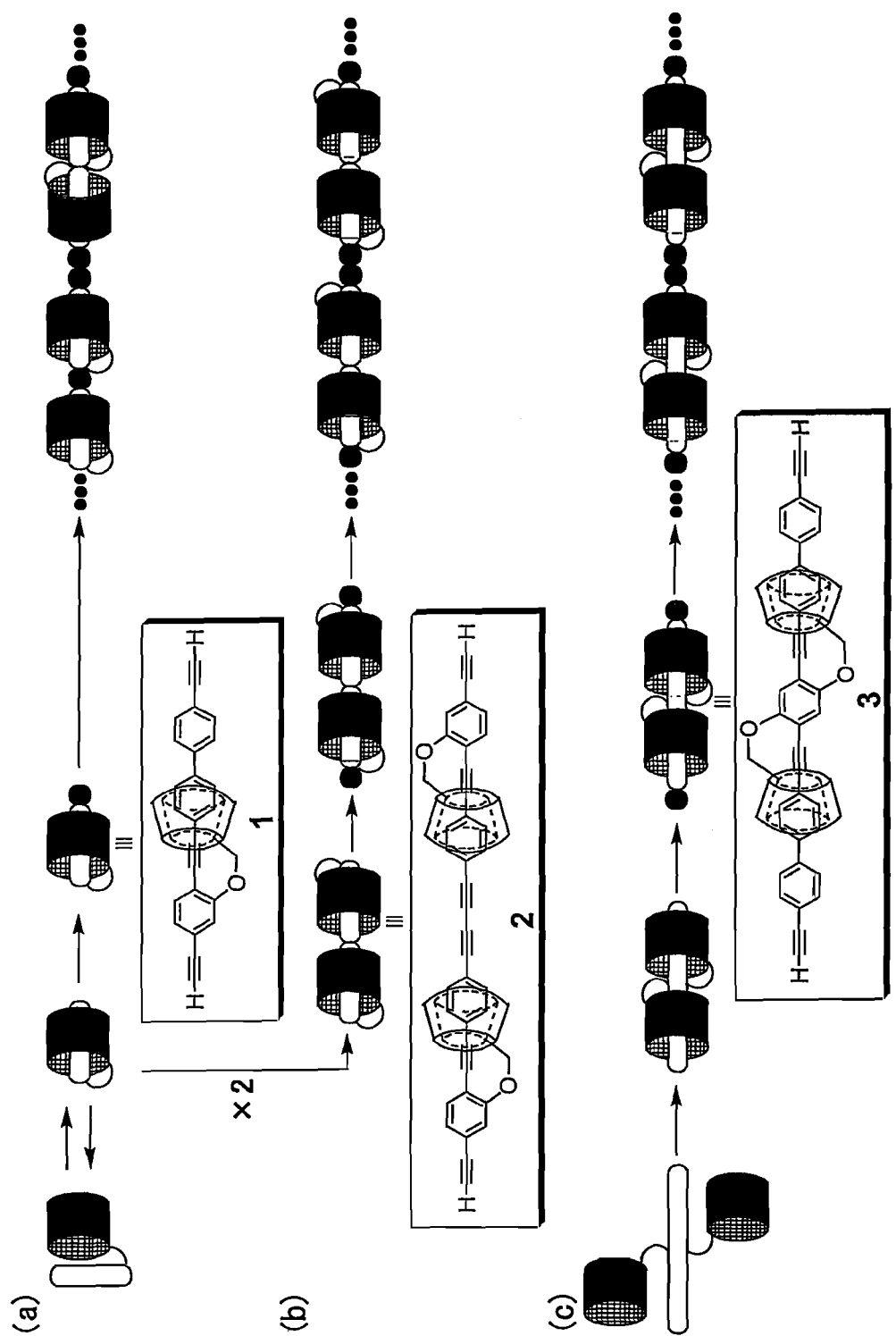
FIG. 3 is a diagram showing examples of the production method of the present invention.

The ring structures of the molecules shown in the left side of FIGS. 1A and 1B each can move with a considerable degree of freedom at its branch joined to the chain component. Accordingly, it is possible to include the chain component in the ring structure, as shown in the right side of FIGS. 1A and 1B, by adjusting a specific condition (for example, a condition of a solvent). Depending on the condition, the molecules shown in the right side of FIGS. 1A and 1B may revert to the original states shown in the left side of FIGS. 1A and 1B, and are not stable. In view of this, it is preferable to extend the chain component as shown in the schematic diagrams of FIGS. 3(a) and (c), or to bond the two included molecules to each other as shown in the schematic diagram of FIG. 3(b). By these reactions, the monomer (M) in which the chain component is included stably can be obtained.

The monomer (M) thus obtained can be present stably in a non-aqueous solvent. Therefore, the polymerization of these monomers (M) makes it possible to synthesize a polyrotaxane in which the organic ring structures include the chain structure regularly in each of a particular repeating unit of the chain structure.

EXAMPLE 1

Hereinafter, examples of the first embodiment will be described. FIGS. 4 to 8 show schemes for synthesizing monomers (M) used in Example 1.

Figure 4:
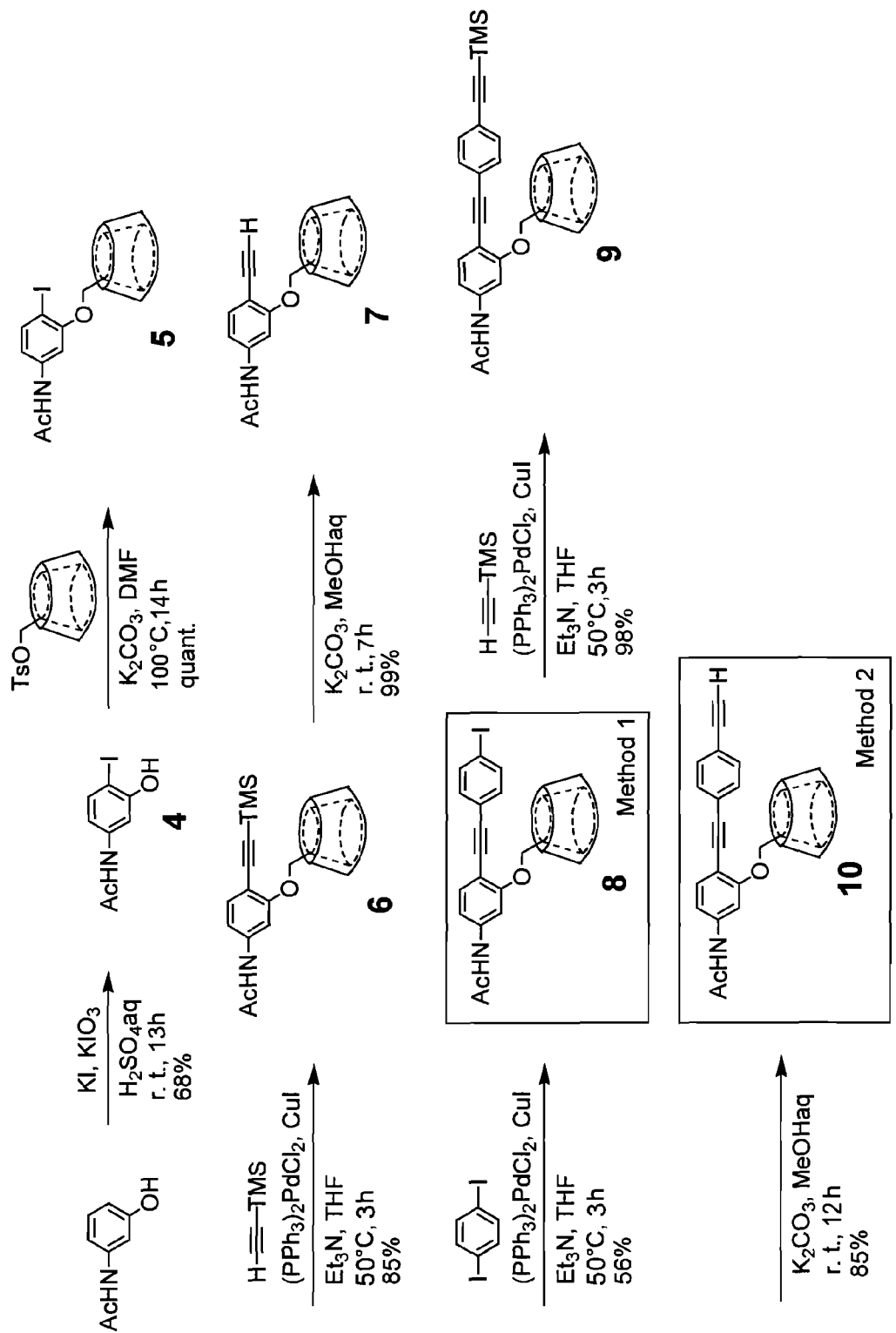
FIG. 4 is a diagram showing partially examples of a method of synthesizing monomers used in Example 1.
Figure 5A:
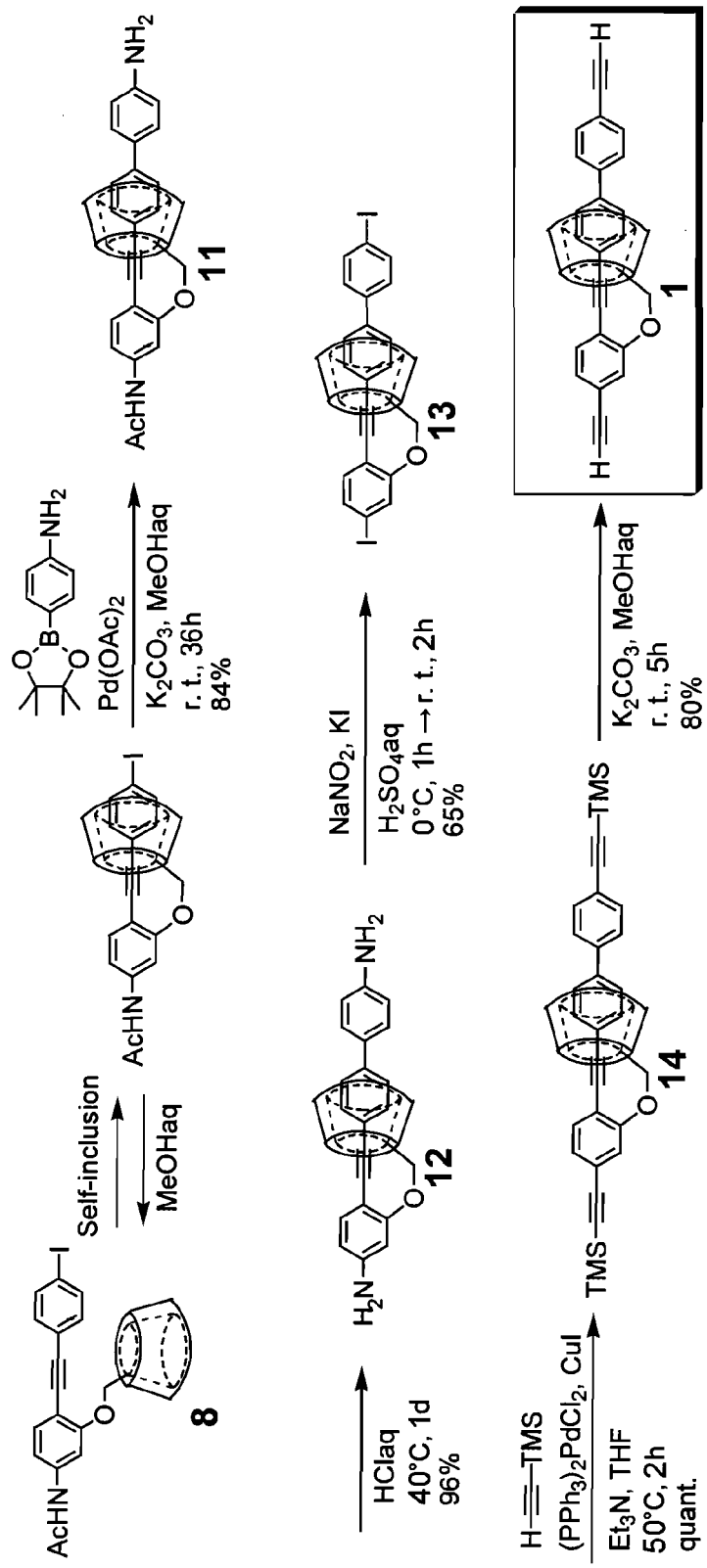
FIG. 5A is a diagram showing reactions subsequent to FIG. 4.
Figure 7:
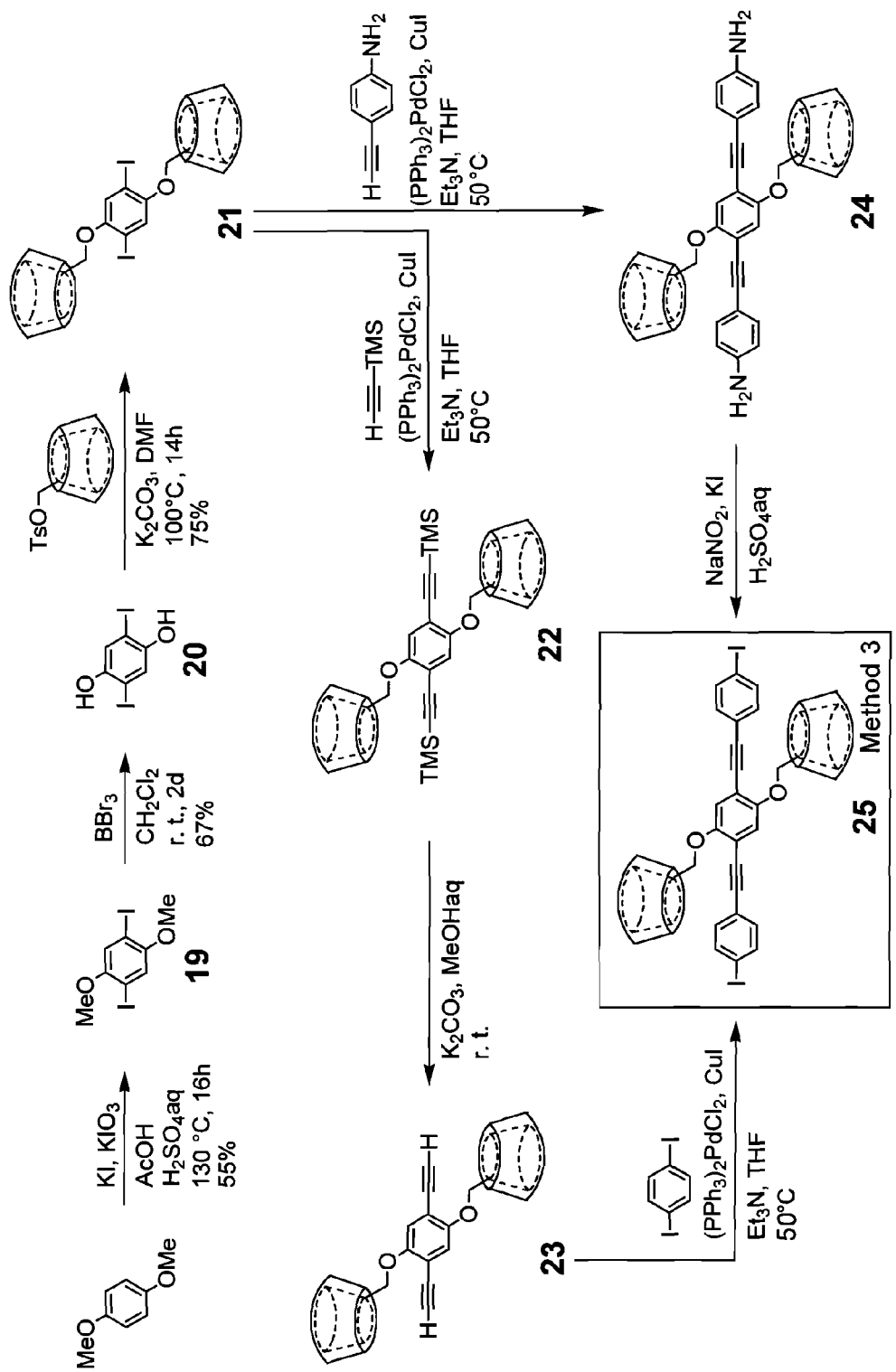
FIG. 7 is a diagram showing partially an example of a method of synthesizing another monomer used in Example 1.
Figure 8:
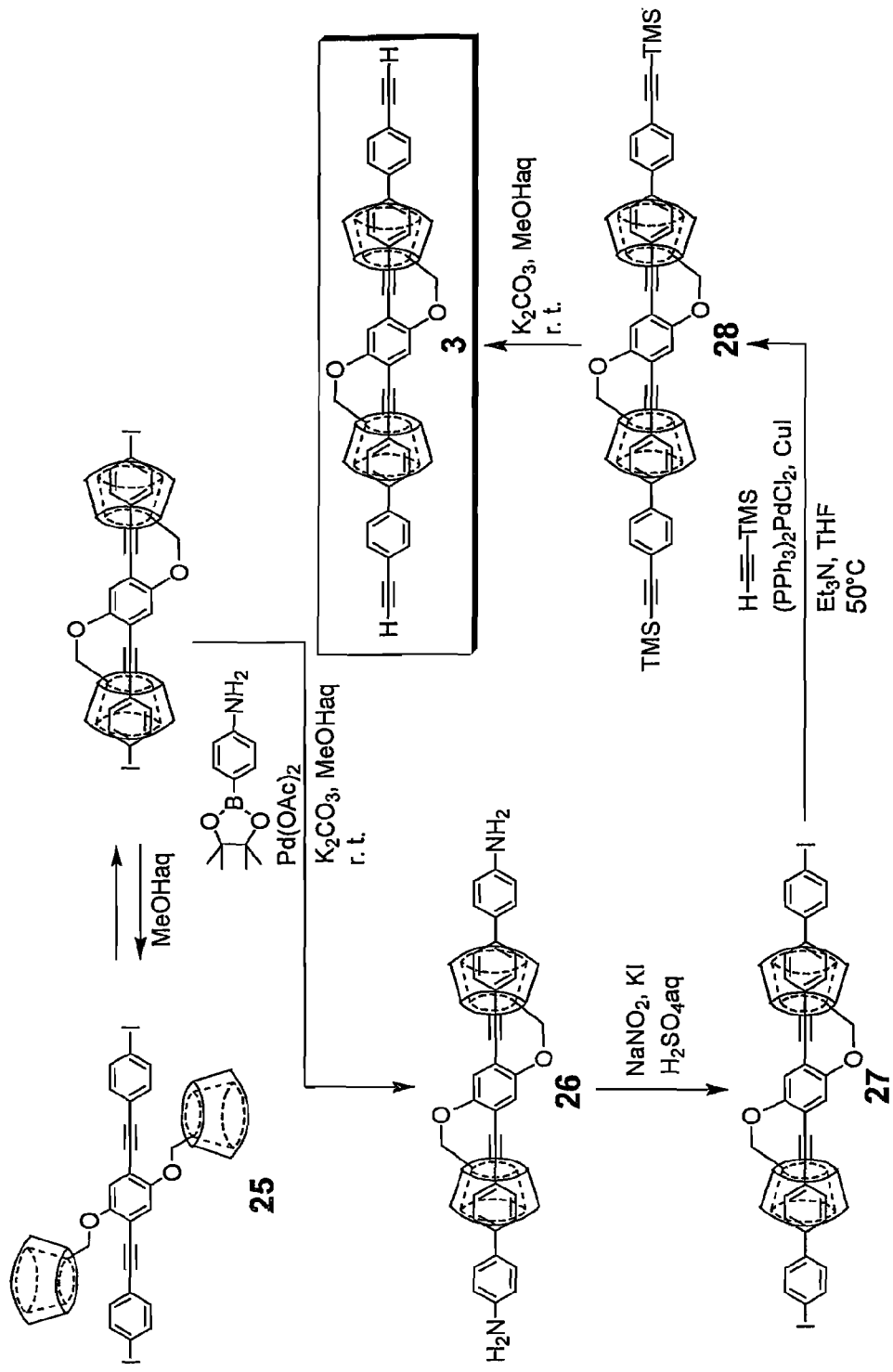
FIG. 8 is a diagram showing reactions subsequent to FIG. 7.

A monomer 1 is synthesized by the reactions shown in FIG. 4 and FIG. 5A. A monomer 2 is synthesized by the reactions shown in FIG. 4 and FIG. 6A. A monomer 3 is synthesized by the reactions shown in FIG. 7 and FIG. 8. In FIG. 4 and FIG. 7, as a starting material constituting an organic ring structure, a compound obtained by substituting one of the hydroxyl groups of an α-cyclodextrin with a tosyl group ($CH_3$—$C_6H_4$—$SO_2$—) and all the other hydroxyl groups with methyl groups was used.

Figure 5B:
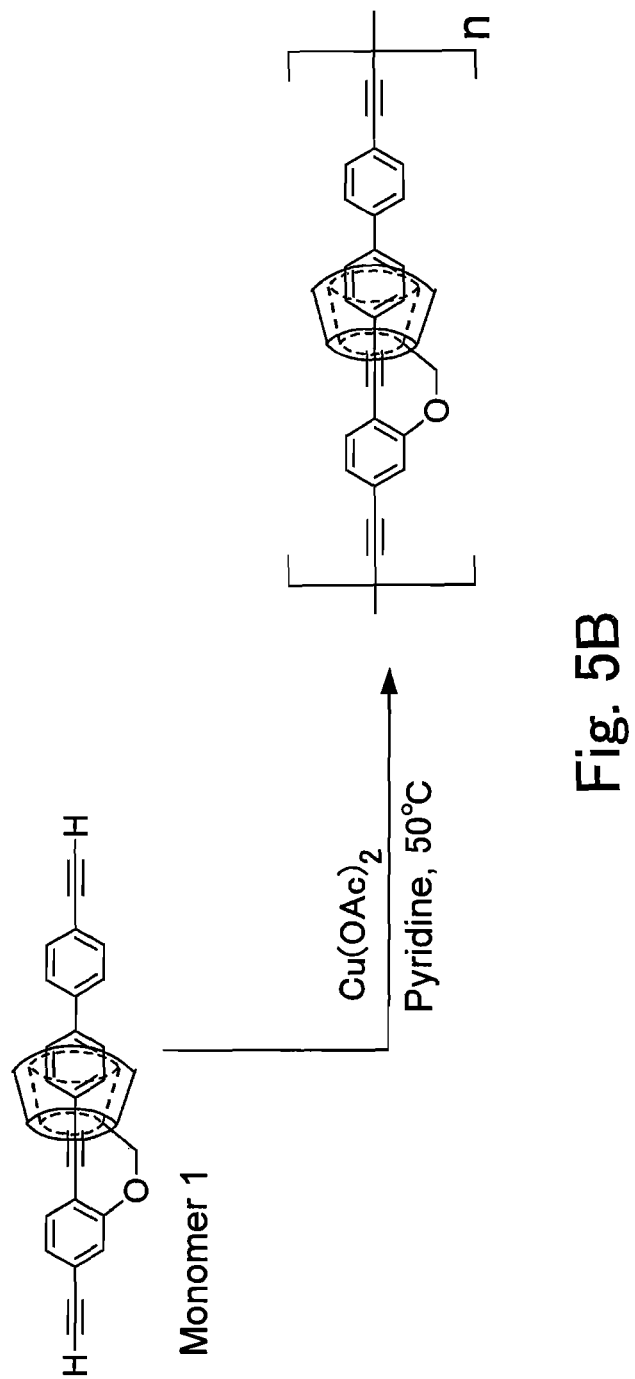
FIG. 5B is a diagram showing an example of a method of synthesizing an organic polymer using the monomers formed in the reactions of FIG. 5A.
Figure 6A:
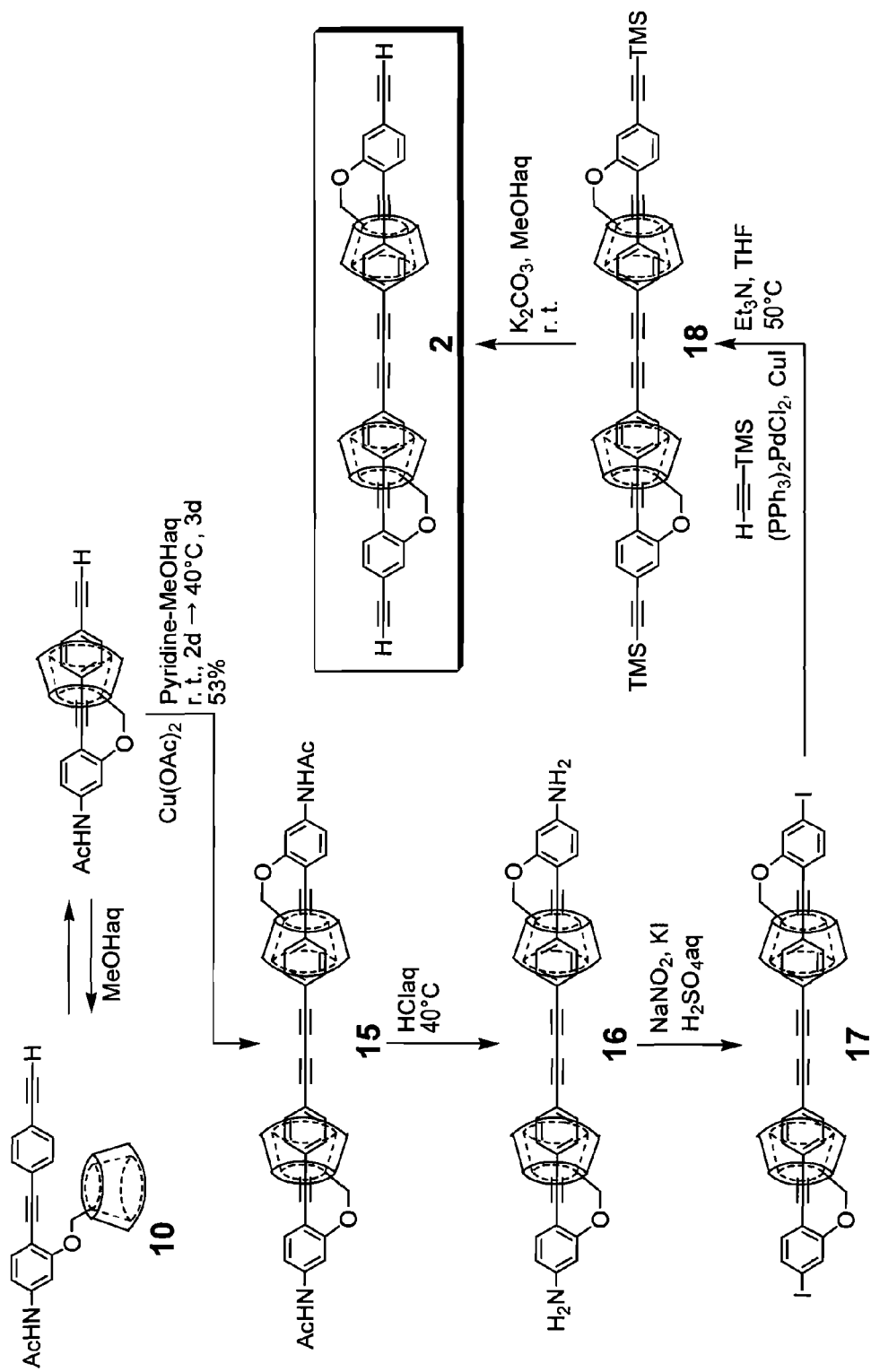
FIG. 6A is a diagram showing other reactions subsequent to FIG. 4.
Figure 6B:
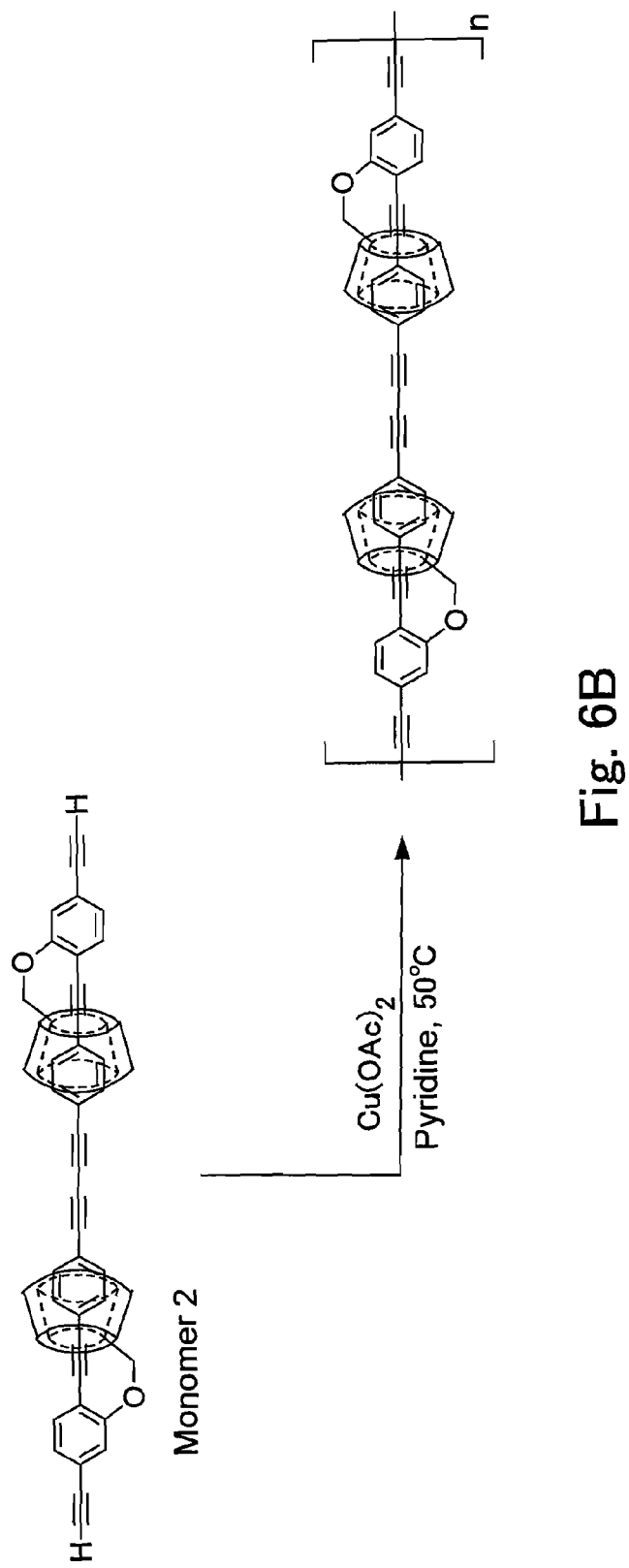
FIG. 6B is a diagram showing an example of a method of synthesizing an organic polymer using the monomers formed in the reactions of FIG. 6A.

In the examples of FIGS. 4, 5A, 6A, 7, and 8, monomers (M) each having polymerization reactive sites of ethynyl groups at both ends thereof are synthesized. The monomers 1, 2, and 3 are polymerized by Eglinton Coupling using a Cu(ii) catalyst in the presence of pyridine in an organic solvent. Thus, the organic polymer of the present invention is synthesized. FIG. 5B shows an example of the polymerization reaction of the monomer 1, and FIG. 6B shows an example of the polymerization reaction of the monomer 2.

[Second Embodiment]

In the second embodiment, an example of an organic polymer in which a chain structure has a side chain and the side chain restricts the movement of an organic ring structure will be described.

Figure 9A:
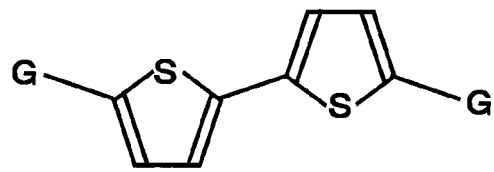
FIGS. 9A to 9D are diagrams showing another example of the method of synthesizing a monomer used in the production method of the present invention.

First, a hydrophobic monomer shown in FIG. 9A and a cyclodextrin are prepared. They are reacted in an aqueous solvent. The chain structure (chain component) is not limited to the chain structure shown in FIG. 9A, and the chain structures described in the first embodiment can be applied. As described in the first embodiment, reactive groups G are present at both ends of the chain structure.

As with the first embodiment, a cyclodextrin having a suitable number of glucoses can be selected according to the size of a hydrophobic monomer to be included therein. Since the above-mentioned hydrophobic monomer has poor water solubility, it is incorporated into the cyclodextrin in the aqueous solvent, and then included therein as shown in FIG. 9B.

Figure 9B:
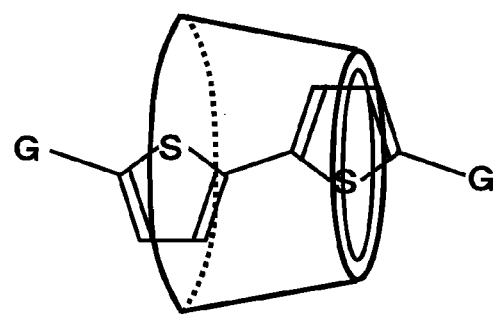
Figure 9C:
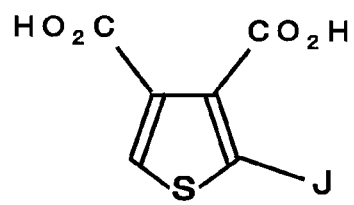
Figure 9D:
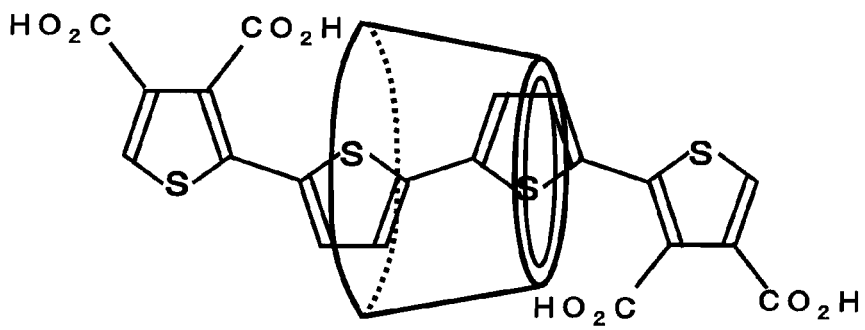

Next, molecules each having a hydrophilic functional group as a side chain are reacted with both ends of the molecule in FIG. 9B. The molecule in FIG. 9C has a reactive group J that reacts with the reactive group G. A molecule as shown in FIG. 9D is obtained by adding the molecule in FIG. 9C. Here, the functional groups to be reacted with both ends of the molecule in FIG. 9B are not limited to carboxyl groups, and they may be any other functional groups. The structure of the molecules to be reacted with both ends of the molecule in FIG. 9B is not limited to a thiophene ring, and it may be a pyrrole ring or the like.

The monomers (M) each having a rotaxane structure thus obtained are isolated from the aqueous solvent. Next, the monomers (M) are polymerized in a non-aqueous solvent. Thus, an organic polymer having no ionic functional group that releases a metal ion is obtained. This organic polymer is a polyrotaxane. In this organic polymer, the organic ring structures include the chain structure regularly in each of a particular repeating unit of the chain structure. For example, Ferric coupling can be used for the polymerization reaction of the monomers (M).

It should be noted that the hydrophilic groups (hydroxyl groups) of the cyclodextrin and the hydrophilic groups (carboxyl groups) of the chain component, respectively, may be substituted with hydrophobic groups.

EXAMPLE 2

Figure 10A:
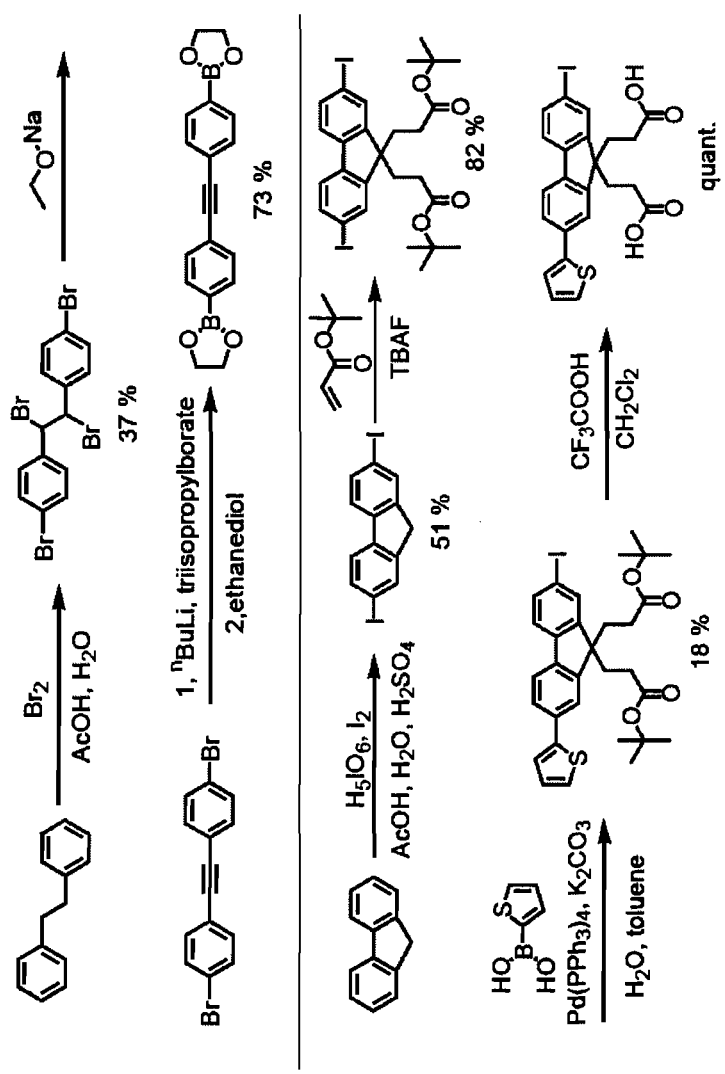
FIG. 10A is a diagram showing partially a method of synthesizing a monomer used in Example 2.
Figure 10B:
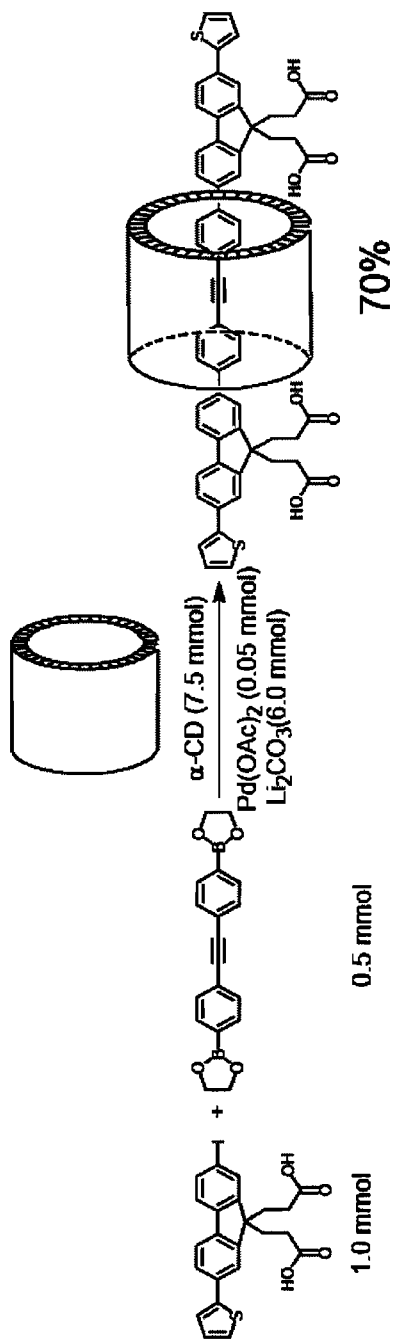
FIG. 10B is a diagram showing a reaction subsequent to FIG. 10A.
Figure 11:
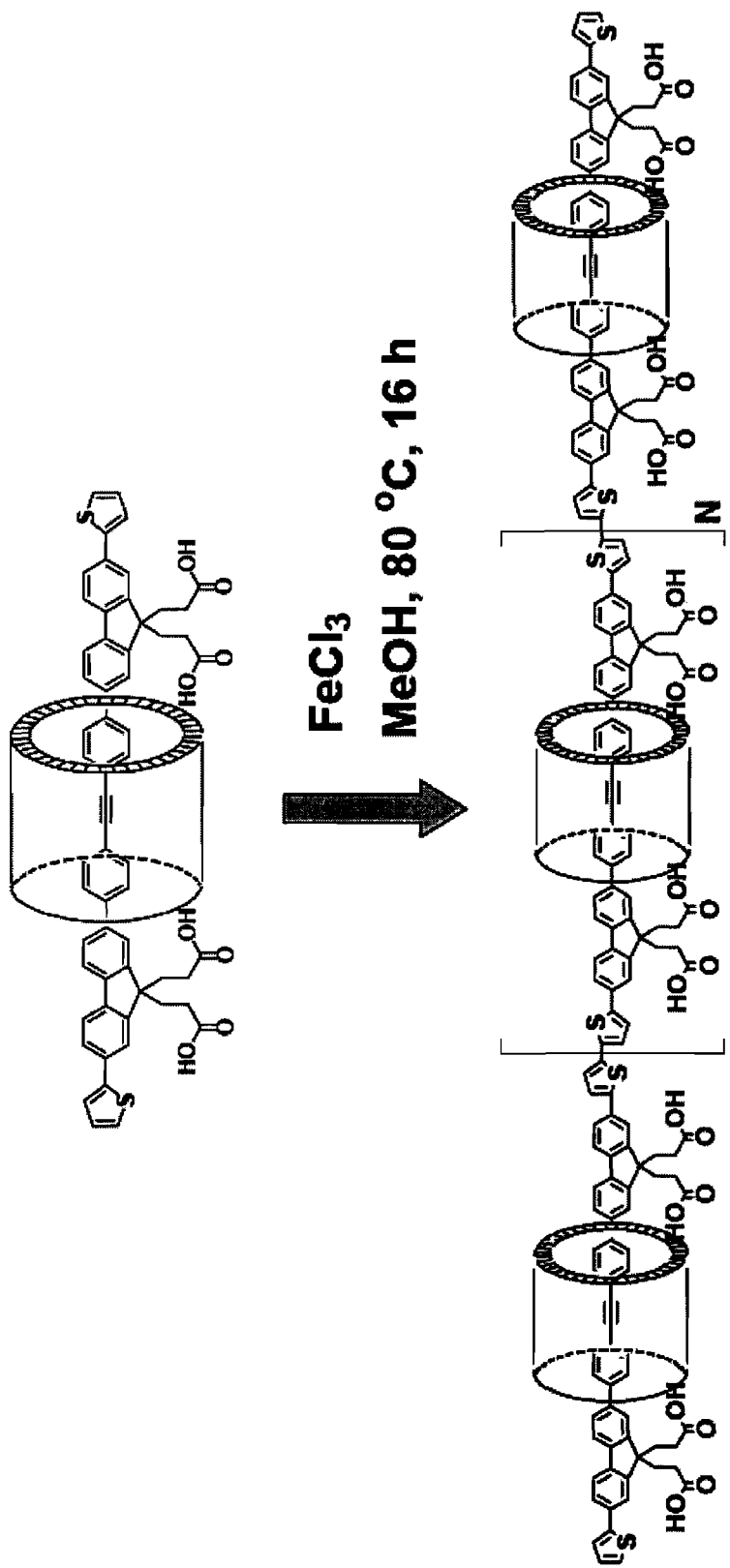
FIG. 11 is a diagram showing a method of polymerizing monomers in Example 2.

Hereinafter, an example of the second embodiment will be described. FIGS. 10A, 10B, and 11 show an example of a scheme for synthesizing the organic polymer of the second embodiment.

First, two types of organic molecules each having a chain structure are synthesized by the reactions shown in FIG. 10A. Next, as shown in FIG. 10B, these two types of organic molecules are reacted in a liquid in which cyclodextrins are present, and thus a monomer (M) is synthesized. The monomer (M) is synthesized by subjecting the two types of molecules synthesized by the reactions in FIG. 10A to a Suzuki coupling reaction, in the proportion of one part to two, in the presence of cyclodextrins and a palladium catalyst. In this case, one of the two organic molecules, which is incorporated into the cyclodextrin, is reacted with the other organic molecule. In the monomer (M) in FIG. 10B, the side chains bonded to the chain structure restrict the movement of the cyclodextrin.

Next, as shown in FIG. 11, the monomers (M) are polymerized in a non-aqueous solvent (specifically, methanol). Thus, the organic polymer of the second embodiment is synthesized.

Figure 12:
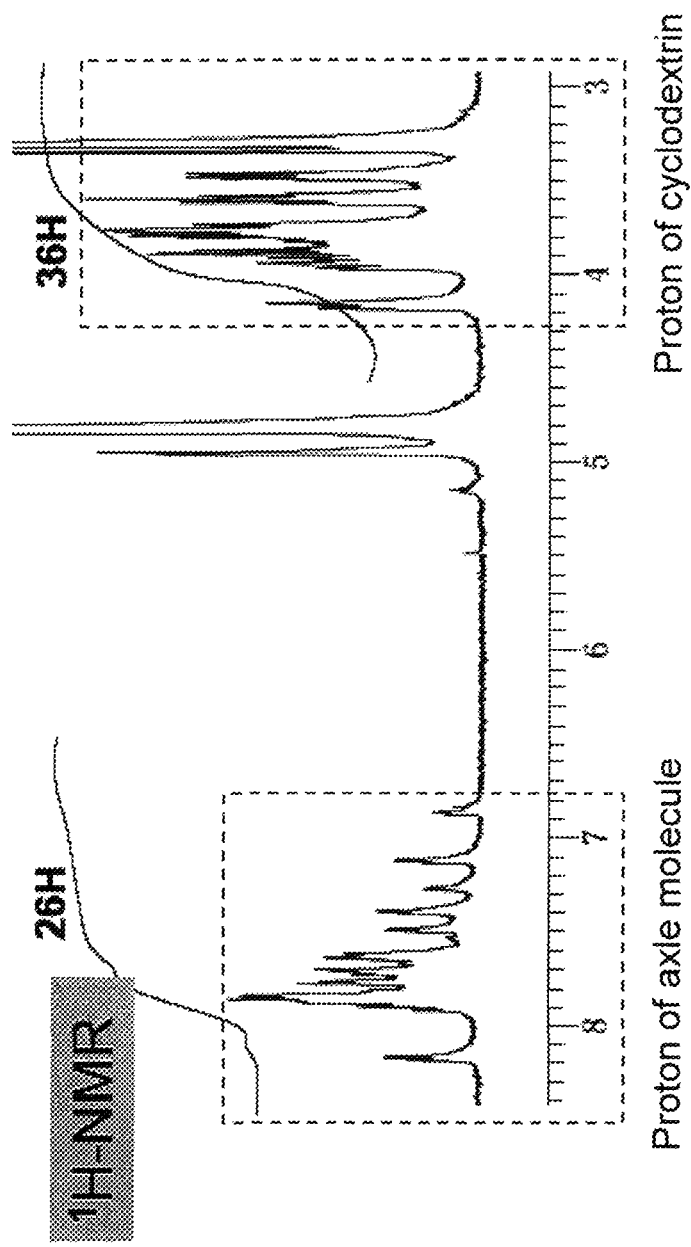
FIG. 12 is a diagram showing a result of $^1$H-NMR measurement of the polymer synthesized in Example 2.

The polymer was produced by the synthesis method shown in FIGS. 10A, 10B, and 11, and the characteristics thereof were evaluated. FIG. 12 shows the result of $^1$H—NMR analysis. The result in FIG. 12 showed that the synthesized polymer has a structure of the polymer shown in FIG. 11.

Figure 13:
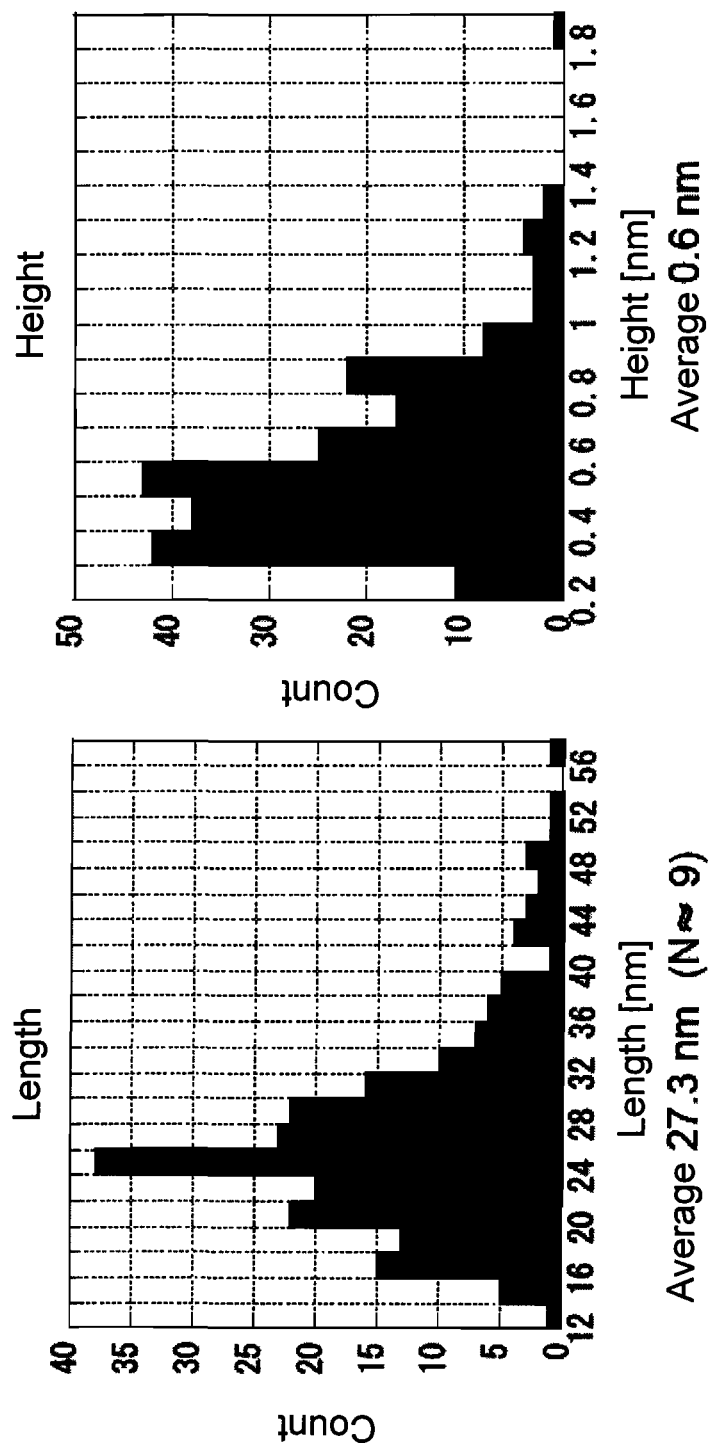
FIG. 13 is a diagram showing measurement results of lengths and heights of the polymers synthesized in Example 2.

The lengths and heights of the synthesized polymers were measured with an atomic force microscope. FIG. 13 shows the results of the measurements. The average length of the polymers was 27.3 nm. This showed that the average degree of polymerization was about 9. The average height of the polymers was about 0.6 nm. This average height is approximately equal to the diameter of one cyclodextrin molecule.

[Third Embodiment]

In the third embodiment, an example of a macrocycle used as an organic ring structure will be described.

Figure 14A:
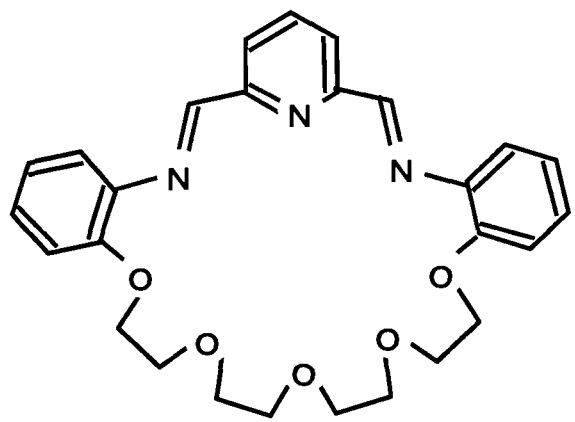
FIGS. 14A to 14C are diagrams showing another example of the method of synthesizing a monomer used in the production method of the present invention.

First, a macrocycle as shown in FIG. 14A is prepared. The macrocycle is not limited to a molecule shown in FIG. 14A, but it is preferable that the macrocycle forms three or more coordinate bonds with a metal atom incorporated into the ring structure so as to keep the planarity of the macrocycle. Furthermore, in the case where the metal to be incorporated into the ring structure is Pd, it is preferable that the macrocycle is a soft base that is expected to have a relatively strong interaction with Pd, which is a soft acid. Examples of the soft base include a cyclic compound containing nitrogen as shown in FIG. 14A. The macrocycle in FIG. 14A is expressed schematically as a circle in FIGS. 14B and 14C.

Figure 14B:
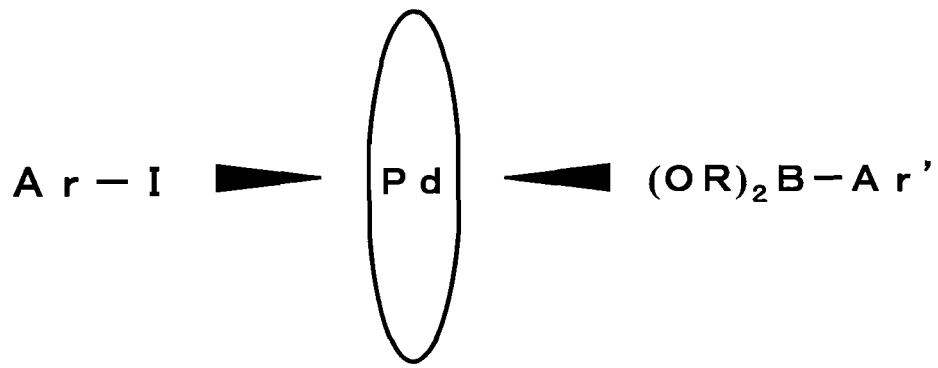
Figure 14C:
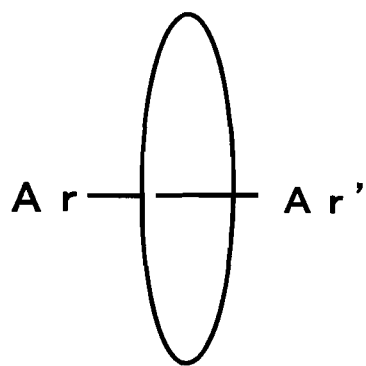

Pd is coordinated with the above macrocycle in an organic solvent. Then, as shown in FIG. 14B, a molecule containing iodine as a reactive site ("Ar—I" in FIG. 14B) and a molecule containing a boron compound as a reactive site ("(OR)₂B—Ar'" in FIG. 14B) are reacted with each other by, for example, Suzuki coupling reaction. A monomer having a rotaxane structure, as shown in FIG. 14C, is obtained by this reaction.

Portions shown as "Ar" and "Ar'" have no hydrophilic group. It is preferable that these portions form a π-electron conjugated chain when Ar and Ar' are bonded. It is preferable that the two molecules to be reacted each have a structure, for example, in which one or plural types of groups, such as an aromatic chain group, a condensed polycyclic aromatic group, a —CH=CH— group, and a —C≡C— group, are coupled in series. Furthermore, the portions shown as "Ar" and "Ar'" each may contain a side chain, a bulky portion, or a bent portion of the chain axis. Still furthermore, the portions shown as "Ar" and "Ar'" each may have two or more cyclic structures whose planes are not parallel to each other. The two molecules having any of these structures restrict the movement of the macrocycle and thus maintain the rotaxane structure even after the polymerization of the monomers. One example of Ar and Ar' has a structure in which a hydrophobic group is bonded to an aromatic ring such as a benzene ring.

A polyrotaxane is obtained by a polymerization reaction of the above rotaxane monomers in an organic solvent. According to this method, it is possible to synthesize a polyrotaxane in which both the chain structure and the organic ring structures have no hydrophilic group and the organic ring structures are disposed regularly in each of a particular repeating unit.

EXAMPLE 3

Figure 15:
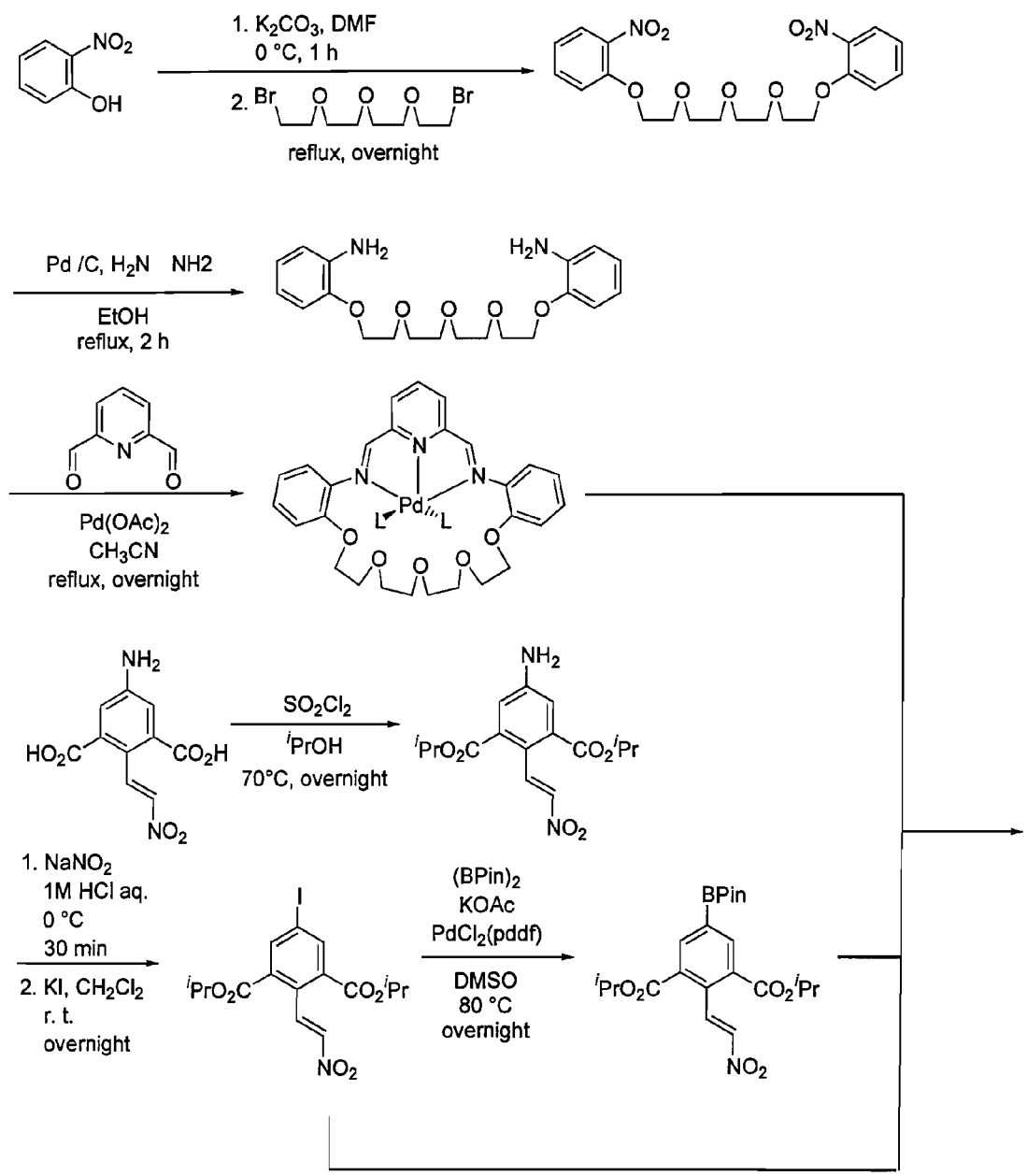
FIG. 15 is a diagram showing partially a reaction scheme of Example 3.

As an example of the third embodiment, a feasible example of an organic polymer will be described. FIG. 15 shows an example of a scheme for synthesizing the organic polymer of the third embodiment.

Figure 16:
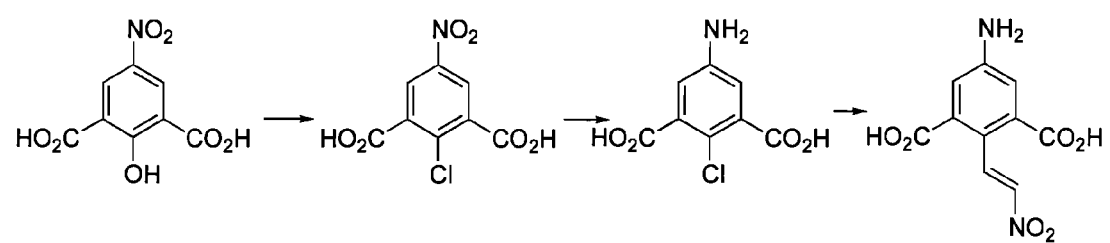
FIG. 16 is a diagram showing partially the reaction scheme of Example 3.

By the reactions shown in FIG. 15, a macrocycle incorporating palladium therein is synthesized. By the reactions shown in FIG. 15, a molecule containing an iodine group as a reactive site and a molecule containing boron as a reactive site also are synthesized. FIG. 16 shows a scheme for synthesizing the starting molecules for the reactions shown in FIG. 15. It should be noted that "BPin" in FIG. 15 denotes the following group.

[Chemical formula 1]

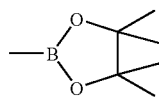

Figure 17:
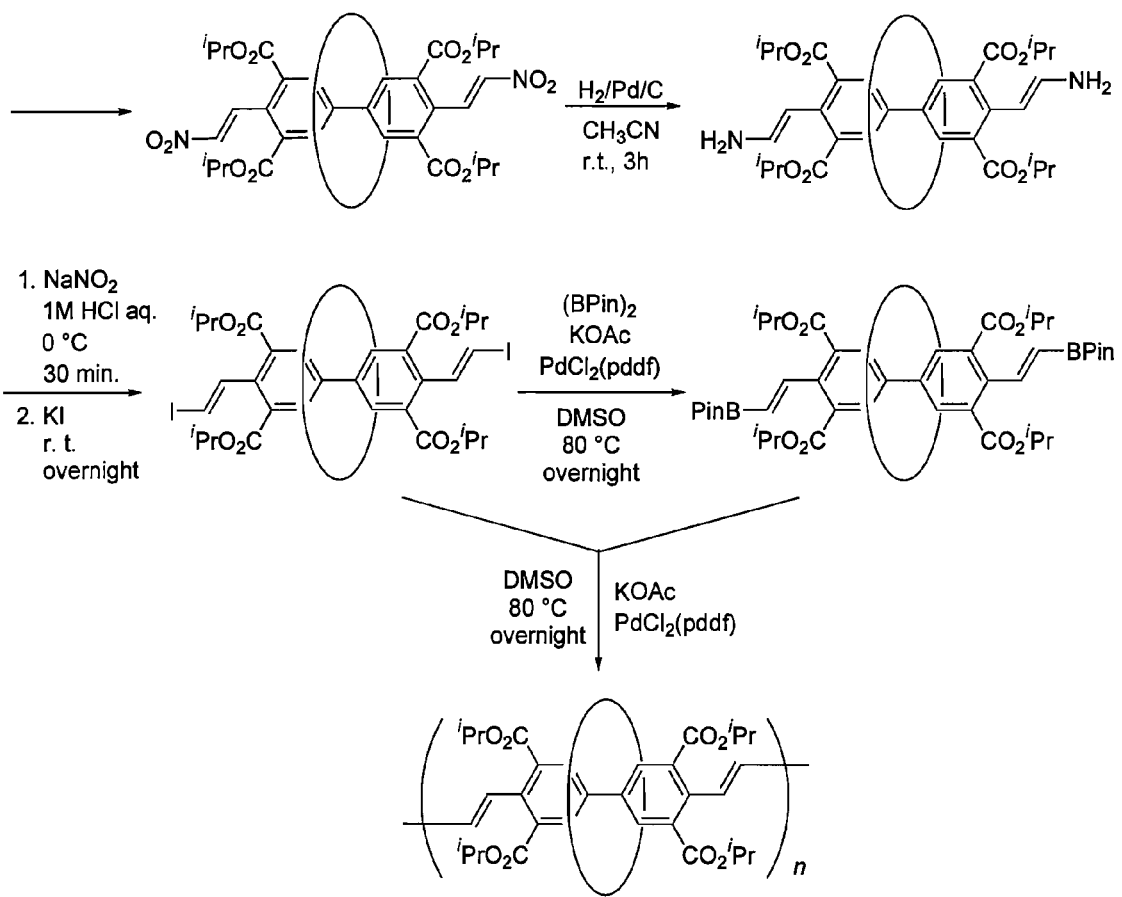
FIG. 17 is a diagram showing partially the reaction scheme of Example 3.

The two types of molecules obtained by the reactions in FIG. 15 are reacted by a Suzuki coupling reaction in DMSO (dimethyl sulfoxide) by using palladium incorporated in the macrocycle as a catalyst. A rotaxane is obtained by this reaction, as shown in FIG. 17. It should be noted that the macrocycle synthesized by the reactions in FIG. 15 is expressed schematically as a circle in FIG. 17.

Next, two types of reactive sites are added to the obtained rotaxane by the reactions shown in FIG. 17. One of these reactive sites is an iodine group, and the other is a group containing boron. These two groups are polymerized by a Suzuki coupling reaction using a Pd catalyst in DMSO, as shown in FIG. 17. Thus, a polyrotaxane is synthesized.

The examples of the production method of the organic polymer of the present invention have been described as above. Each of the reactions in the above-mentioned synthesis processes may be carried out under other known conditions.

INDUSTRIAL APPLICABILITY

The organic polymer of the present invention can be applied as a new material for high-performance materials in the medical, chemical and electronics fields. It can be applied to electronic devices, especially when the chain structure has conductivity.

The invention claimed is:
1. An organic polymer comprising;
    two or more organic ring structures; and
    a chain structure threading through the two or more organic ring structures,
    wherein the organic polymer contains a plurality of constitutional units,
    each of the plurality of constitutional units contains at least one of the two or more organic ring structures and a part of the chain structure,
    in the each of the plurality of the constitutional units, the part of the chain structure threads through the at least one of the two or more organic ring structures,
    each of the two or more organic ring structures is a ring structure of cyclodextrin,
    a —CH₂OH group of the cyclodextrin is bound to the part of the chain structure in a form of —CH₂O— in the each of the plurality of the constitutional units,
    the each of the plurality of the constitutional units has no ionic functional group, and
    the chain structure contains at least one aromatic ring.
2. The organic polymer according to claim 1, wherein the ring structure of the cyclodextrin, which is the each of the two or more organic ring structures, is bound to the chain structure through one single —CH₂O— group.
3. The organic polymer according to claim 1,
    wherein the part of the chain structure contained in a first constitutional unit of the plurality of the constitutional units is bound to the part of the chain structure contained in a second constitutional unit of the plurality of the constitutional units adjacent to the first constitutional unit, and
    no organic ring structure is present in a binding portion between the part of the chain structure contained in the first constitutional unit and the part of the chain structure contained in the second constitutional unit.
4. The organic polymer according to claim 1, wherein the chain structure has no hydrophilic functional group.
5. The organic polymer according to claim 1, wherein hydrophobic functional groups bonded to the organic ring structures are greater in number than hydrophilic functional groups bonded to the organic ring structures.
6. The organic polymer according to claim 1, wherein functional groups bonded to the organic ring structures are all hydrophobic.
7. The organic polymer according to claim 1, wherein the chain structure has conductivity.
8. An organic polymer comprising: a first constitutional unit; a second constitutional unit, and a chain structure comprising a first part and a second part, wherein the first constitutional unit comprises:
  at least one first organic ring structure; and
  the first part of the chain structure,
  wherein the first part of the chain structure threads through the at least one first organic ring structure,
  the at least one first organic ring structure comprises a ring structure of cyclodextrin,
  one —$CH_2OH$ group contained in the at least one first organic ring structure is bound to the chain structure in a form of —$CH_2O$—, and
wherein the second constitutional unit comprises:
  at least one second organic ring structure; and
  the second part of the chain structure,
  wherein the second part of the chain structure threads through the at least one second organic ring structure,
  the at least one second organic ring structure comprises a ring structure of cyclodextrin,
  one —$CH_2OH$ group contained in the at least one second organic ring structure is bound to the same chain structure in a form of —$CH_2O$—, and
wherein each of the first constitutional unit and the second constitutional unit has no ionic functional group, and
the chain structure comprises at least one aromatic ring.

* * * * *